(No Model.)

S. A. MOULTON.
CULTIVATOR.

No. 316,164. Patented Apr. 21, 1885.

WITNESSES

S. A. Moulton
INVENTOR
By C. A. Snow & Co.
Attorneys

UNITED STATES PATENT OFFICE.

STILLMAN AUGUSTUS MOULTON, OF SAN JOSÉ, CALIFORNIA.

CULTIVATOR.

SPECIFICATION forming part of Letters Patent No. 316,164, dated April 21, 1885.

Application filed January 5, 1885. (No model.)

*To all whom it may concern:*

Be it known that I, STILLMAN A. MOULTON, a citizen of the United States, residing at San José, in the county of Santa Clara and State of California, have invented a new and useful Improvement in Cultivators, of which the following is a specification, reference being had to the accompanying drawings.

My invention relates to cultivators; and it consists in the construction and novel combination of parts, as will be hereinafter fully described, and particularly pointed out in the claims.

Figure 1:
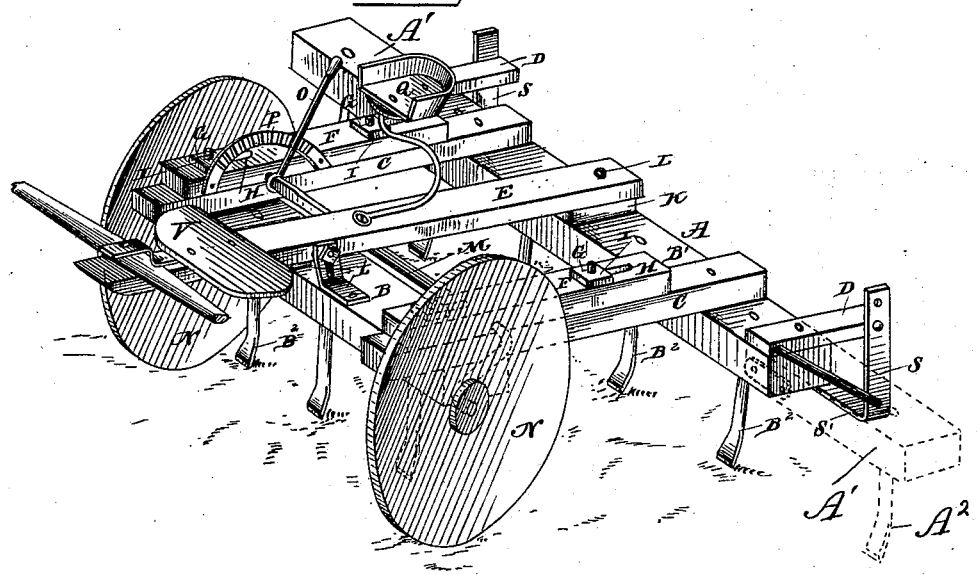
Figure 2:
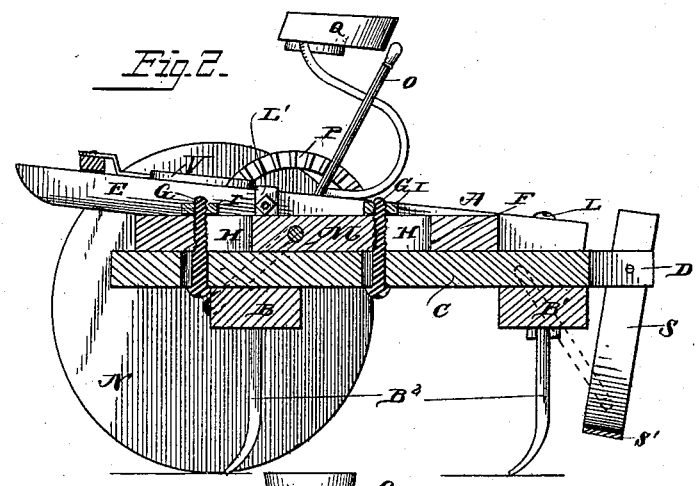
Figure 3:
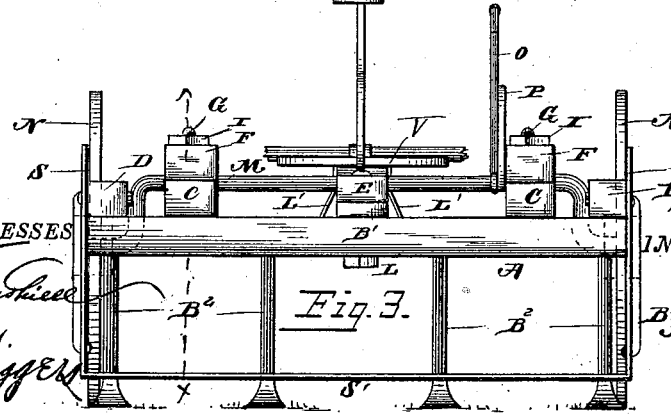

In the drawings, Figure 1 is a view in perspective of a cultivator embodying my improvements. Fig. 2 is a vertical longitudinal section on the line $x$ $x$ in Fig. 3, and Fig. 3 is a rear elevation.

Referring by letter to the accompanying drawings, A designates the frame of the machine, which comprises the front and rear transverse tooth-bars, B B', the connecting-bars C near the ends of the front and rear bars, the slotted extension-bars F on the side bars, the short rearwardly-extending bars D on the rear tooth bar, B', and the adjustable tongue E. The slotted extension-bars are secured to the side bars by bolts G, passed up through slots H in said side bars, C, nuts I being employed at the upper ends of the bolts G to hold the bars together and permit their adjustment.

The tongue E is secured upon a block, K, upon the rear cross-beam of the frame by a bolt and nut, L, at its rear end, and is also secured between slotted standards L' L', rising from the front cross-beam of the frame.

The axle M is a crank-axle, and is mounted in bearings in the extension-bars, and is provided with supporting-wheels N N on its journals.

The axle is provided with a hand-lever, O, which engages a rack, P, when not in use in raising and lowering the wheels, said lever O being within convenient reach of the driver when occupying the seat Q. The tooth-bars B B' are provided with cultivator-teeth B², and the rear tooth-bar, B', is provided at its ends with the short bars D, to which the vertical arms S of the weed-cutter S' are pivoted and strengthened by inclined brace-rods s'.

The two intermediate cultivator-teeth may be removed, leaving an uncultivated strip between the remaining two teeth in each beam.

The seat is nearly over, yet a little in the rear of, the axle, so that the weight of the driver nearly balances the tongue and relieves the necks of the horses from the weight of the tongue.

A foot-piece, V, is secured to the tongue in front of the driver's seat within convenient reach of the driver's feet.

The weed-cutter S' is detachable, and may be removed when necessary to use the cultivator without it.

The cultivator-teeth are so arranged that they follow in the tracks made by the team and by the wheels of the cultivator and obliterate the tracks.

The axle being adjustable, the plows can be adjusted by the employment of the lever O to plow deep or shallow, as may suit the soil in which the plowing is being done.

The slotted extension-bars F can be moved on the side bars, C, back and forward, and when said extension-bars F are moved the axle is moved on the side bars, and the draft is changed.

When operating the plows in deep cultivation, the draft is heavy on the horses, and by having the axle adjustable on the frame the draft can be readily regulated to suit the nature of the cultivation. The cultivator-frame may be made to project behind the wheels at each end, and the projections should be provided with cultivator-teeth, so that the machine can be driven close to trees to cultivate in an orchard.

When made very wide, the intermediate cultivator-teeth may be removed, so that a strip will be left to be cultivated on the return trip by lapping.

In Fig. 1 I show extensions A', which are attached to the rear transverse beam, A, and project beyond the sides of the cultivator in rear of the supporting-wheels. Cultivator-teeth A² are secured to these extensions, as shown. When these extensions are attached to the cultivator, I am enabled to cultivate the soil close around the trunks of low-branching fruit or other trees, the branches of which are too low to permit the entire cultivator to be driven under them, and thus I adapt my cultivator for use in orchards, which adds greatly to its value.

Having thus fully described my invention, what I claim as new, and desire to secure by Letters Patent of the United States, is—

1. In a cultivator, the combination of the frame carrying the teeth, the tongue secured to said frame, the slotted extension-bars F, the axle journaled in said bars, and the supporting-wheels, the axle being adjustable longitudinally on the frame, for the purpose set forth, substantially as described.

2. In a cultivator, the combination of the frame carrying the teeth, the tongue secured to said frame, the cranked axle journaled in blocks or bars that are adapted to be moved back or forth on the frame, a lever for turning the cranked axle, and a detent for securing said lever at any desired point, substantially as described.

In testimony that I claim the foregoing as my own I have hereto affixed my signature in presence of two witnesses.

STILLMAN AUGUSTUS MOULTON.

Witnesses:
JAS. M. PITMAN,
W. H. OWENS.